(12) United States Patent
Sekimura et al.

(10) Patent No.: US 9,193,094 B2
(45) Date of Patent: Nov. 24, 2015

(54) METHOD FOR PRODUCING RESIN COMPOSITION

(71) Applicant: Sumitomo Chemical Company, Limited, Tokyo (JP)

(72) Inventors: Satoshi Sekimura, Tokyo (JP); Hiroshi Harada, Singapore (SG); Koichi Mizumoto, Ibaraki (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/374,710

(22) PCT Filed: Dec. 21, 2012

(86) PCT No.: PCT/JP2012/083244
§ 371 (c)(1),
(2) Date: Jul. 25, 2014

(87) PCT Pub. No.: WO2013/114763
PCT Pub. Date: Aug. 8, 2013

(65) Prior Publication Data
US 2015/0011691 A1 Jan. 8, 2015

(30) Foreign Application Priority Data

Jan. 30, 2012 (JP) ................................. 2012-017281

(51) Int. Cl.
| | | |
|---|---|---|
| *C08J 5/10* | (2006.01) | |
| *C08K 7/02* | (2006.01) | |
| *B29B 7/00* | (2006.01) | |
| *C08J 5/04* | (2006.01) | |
| *C08K 3/22* | (2006.01) | |
| *C09K 19/38* | (2006.01) | |
| *C08K 7/00* | (2006.01) | |
| *C08K 7/08* | (2006.01) | |
| *C08K 7/10* | (2006.01) | |
| *C08K 7/14* | (2006.01) | |
| *C09K 19/52* | (2006.01) | |
| *B29K 67/00* | (2006.01) | |
| *B29K 483/00* | (2006.01) | |
| *B29K 485/00* | (2006.01) | |
| *B29K 505/02* | (2006.01) | |
| *B29K 509/08* | (2006.01) | |

(52) U.S. Cl.
CPC ................ *B29B 7/002* (2013.01); *C08J 5/044* (2013.01); *C08J 5/10* (2013.01); *C08K 3/22* (2013.01); *C08K 7/00* (2013.01); *C08K 7/02* (2013.01); *C08K 7/08* (2013.01); *C08K 7/10* (2013.01); *C08K 7/14* (2013.01); *C09K 19/3809* (2013.01); *B29K 2067/00* (2013.01); *B29K 2483/00* (2013.01); *B29K 2485/00* (2013.01); *B29K 2505/02* (2013.01); *B29K 2509/08* (2013.01); *B29K 2509/14* (2013.01); *C08J 2367/03* (2013.01); *C08K 2003/2241* (2013.01); *C08K 2201/009* (2013.01); *C08K 2201/016* (2013.01); *C09K 2019/521* (2013.01); *C09K 2019/528* (2013.01)

(58) Field of Classification Search
CPC .................................... C08J 5/10; C08K 7/00
USPC ......................................... 252/299.01, 299.5
See application file for complete search history.

(56) References Cited

U.S. PATENT DOCUMENTS

| | | | |
|---|---|---|---|
| 5,965,639 A | 10/1999 | Yamauchi et al. | |
| 7,740,770 B2 * | 6/2010 | Mizumoto et al. | ....... 252/299.01 |
| 2008/0203358 A1 | 8/2008 | Mizumoto et al. | |
| 2010/0053972 A1 | 3/2010 | Nakayama | |
| 2010/0327728 A1 | 12/2010 | Saito et al. | |

FOREIGN PATENT DOCUMENTS

| | | |
|---|---|---|
| JP | S44-7542 B | 4/1969 |
| JP | S62-179780 A | 8/1987 |
| JP | H01-165667 A | 6/1989 |
| JP | H06-240114 A | 8/1994 |
| JP | 10-237276 A | 9/1998 |
| JP | 2005-232210 A | 9/2005 |
| JP | 2007-277423 A | 10/2007 |
| JP | 2008-074992 A | 4/2008 |
| JP | 2008-239950 A | 10/2008 |
| JP | 2011-026579 A | 2/2011 |
| WO | 2008123263 A1 | 10/2008 |

OTHER PUBLICATIONS

Koide, "Liquid Crystalline Polymer Synthesis Molding Applications," CMC, p. 95 (Jun. 5, 1987).
Int'l Search Report issued Feb. 5, 2013 in Int'l Application No. PCT/JP2012/083244.

* cited by examiner

*Primary Examiner* — Vickey Nerangis
(74) *Attorney, Agent, or Firm* — Panitch Schwarze Belisario & Nadel LLP

(57) ABSTRACT

The present invention is related to a method for producing a resin composition including feeding a resin (A), a fibrous filler (B), and a particulate filler (C) which is harder than the fibrous filler (B) to an extruder, and melt-kneading to extrude a kneaded material, the resin composition comprising a fibrous filler (B) which is 140 μm or less in weight average fiber length. According to the present invention, a production method with high versatility is provided in which a resin composition containing the fibrous filler having the weight average fiber length of 140 μm or less is effectively produced.

7 Claims, 1 Drawing Sheet

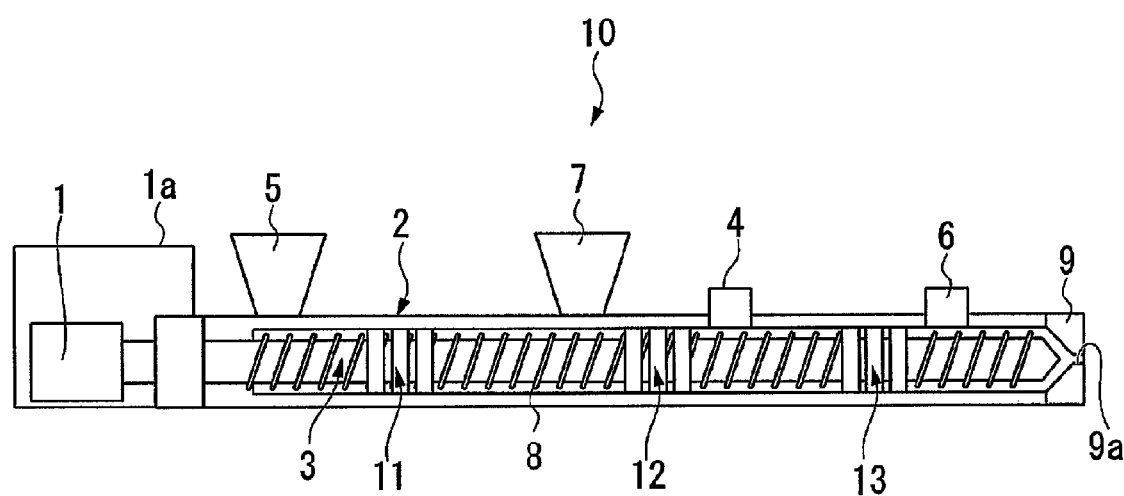

METHOD FOR PRODUCING RESIN COMPOSITION

CROSS-REFERENCE TO RELATED APPLICATION

This application is a Section 371 of International Application No. PCT/JP2012/083244, filed Dec. 21, 2012, which was published in the Japanese language on Aug. 8, 2013, under International Publication No. WO 2013/114763 A1, and the disclosure of which is incorporated herein by reference.

TECHNICAL FIELD

The present invention relates a method for producing a resin composition. Priority is claimed on Japanese Patent Application No. 2012-017281 filed Jan. 30, 2012, the content of which is incorporated herein by reference.

BACKGROUND ART

Among resins, liquid crystalline polyesters exhibit favorable molding processability, have high levels of heat resistance and strength, and provide excellent insulating properties, and are therefore used as materials for electrical and electronic components and optical components.

With liquid crystalline polyesters, the molecular chains align readily along the flow direction during molding, and anisotropy tends to develop in the molding shrinkage rate and the mechanical properties between the flow direction and the direction perpendicular thereto. As a result, in order to reduce this anisotropy, fillers of various shapes, including fibrous fillers and plate-like fillers, are mixed into the resin.

On the other hand, when a fibrous filler is mixed with a liquid crystalline polyester, in order to obtain the desired levels of fluidity, moldability and molded article strength, it is preferable that the average fiber length of the filler is controlled. In particular, in order to obtain a molded article with improved levels of dust generation, which can occur due to dislodgement of the fibrous filler and the resulting generation of resin waste, it is important that the weight average fiber length of the fibrous filler in the molded article is shortened to a value within a prescribed range, such as a length of not more than 400 μm.

In this regard, Patent Document 1 discloses a method of obtaining a molded item by injection molding pellets obtained from a glass fiber-reinforced liquid crystalline resin composition, prepared by filling (A) 100 parts by weight of at least one liquid crystalline resin selected from among liquid crystalline polyester resins which form an anisotropic melt phase and liquid crystalline polyesteramide resins with (B) 5 to 300 parts by weight of glass fibers with an average fiber diameter of 3 to 15 μm and subsequently performing melt-kneading, wherein the weight average fiber length in the pellets is within a range from 0.02 to 0.55 mm, the proportion of glass fibers with a fiber length exceeding 1 mm is from 0 to 15% by weight of the glass fibers, and the proportion of glass fibers with a fiber length of not more than 0.1 mm is from 0 to 50% by weight of the glass fibers. The determination of the flow length during the injection molding and the shrinkage rate of the molded item is also disclosed.

CITATION LIST

Patent Document

[Patent Document 1] Japanese Unexamined Patent Application, First Publication No. H6-240114

SUMMARY OF INVENTION

Problem that the Invention is to Solve

However, the method disclosed in Patent Document 1 is low in versatility, for example because an apparatus provided with two raw material input (feeding) ports and a screw arrangement for shortening the glass fiber into a predetermined size is required as an apparatus used for melt-kneading, and Patent Document 1 does not disclose any technology which shortens the weight average fiber length of the glass fiber in the resin composition to a range of 140 μm or less, without limiting the apparatus and repeating the melt-kneading. Therefore, development of an efficient and highly versatile production method capable of obtaining a resin composition containing the fibrous filler having such a fiber length has been desired.

The present invention has been made in consideration of the above circumstances, and an object of the invention is to provide an efficient and highly versatile method for producing a resin composition which contains the fibrous filler being 140 μm or less in weight average fiber length.

Means for Solving the Problem

To solve the above problems, the present invention provides a method for producing a resin composition including feeding a resin (A), a fibrous filler (B), and a particulate filler (C) which is harder than the fibrous filler (B) to an extruder, and melt-kneading to extrude a kneaded material, the resin composition comprising a fibrous filler (B) which is 140 μm or less in weight average fiber length.

In the method for producing a resin composition according to the present invention, the fibrous filler (B) to be fed to the extruder is 1 mm or more in weight average fiber length.

In the method for producing a resin composition according to the present invention, the amount of the resin (A) is 50% by mass to 80% by mass based on the total supplied amount of the resin (A) and the fibrous filler (B), and the supplied amount of the particulate filler (C) is 0.1 parts by mass to 3 parts by mass relative to 100 parts by mass of the total supplied amount of the resin (A) and the fibrous filler (B).

In the method for producing a resin composition according to the present invention, the resin (A) is a liquid crystal polyester.

In the method for producing a resin composition according to the present invention, the fibrous filler (B) is preferably one or more fibers selected from the group consisting of glass fiber, basalt fiber, alumina fiber, and silica alumina fiber.

That is, the present invention relates to the following.

[1] A method for producing a resin composition in which by feeding a resin (A), a fibrous filler (B), and a particulate filler (C) which is harder than the fibrous filler (B) to an extruder and extruding the kneaded material obtained by melt-kneading, a resin composition is obtained, and the fibrous filler (B) in the resin composition has a weight average fiber length of 140 μm or less.

[2] The method for producing the resin composition according to [1] in which the weight average fiber length of the fibrous filler (B) which is fed to the extruder is 1 mm or greater.

[3] The method for producing the resin composition according to [1] or [2] in which the proportion of the resin (A) relative to the total supplied amount of the resin (A) and the fibrous filler (B) is 50% by mass to 80% by mass, and the supplied amount of the particulate filler (C) relative to 100 parts by mass of the total supplied amount of the resin (A) and the fibrous filler (B) is 0.1 parts by mass to 3 parts by mass.

[4] The method for producing the resin composition according to any one of [1] to [3] in which the resin (A) is one or more selected from the group consisting of liquid crystal polyester, polyphenylene sulfide, polyether sulfone, polyamide, and polyimide.

[5] The method for producing resin composition according to any one of [1] to [4] in which the resin (A) is liquid crystal polyester.

[6] The method for producing a resin composition according to any one of [4] or [5] in which the liquid crystal polyester has a repeating unit represented by the following formula (1).

[Chem. 1]

—O—Ar¹—CO—      (1)

(In the formula, Ar¹ represents a phenylene group, a naphthylene group, or a biphenylylene group.)

[7] The method for producing a resin composition according to [6] in which the liquid crystal polyester further has a repeating unit represented by the following formula (2) and a repeating unit represented by the following formula (3).

[Chem. 2]

—CO—Ar²—CO—      (2)

[Chem. 3]

—X—Ar³—Y—      (3)

(In the formula, each of Ar² and Ar³ independently represents a phenylene group, a naphthylene group, a biphenylylene group, or a group represented by the following general formula (4); each of X and Y independently represents an oxygen atom or an imino group; and each of one or more hydrogen atoms in the Ar¹, Ar², and Ar³ may be independently substituted with a halogen atom, an alkyl group, or an aryl group.)

[Chem. 4]

—Ar⁴—Z—Ar⁵—      (4)

(In the formula, each of Ar⁴ and Ar⁵ independently represents a phenylene group or a naphthylene group; and Z represents an oxygen atom, a sulfur atom, a carbonyl group, a sulfonyl group, or an alkylidene group.)

[8] The method for producing a resin composition according to [7] in which Ar¹ represents a 1,4-phenylene group or a 2,6-naphthylene group.

[9] The method for producing a resin composition according to [7] or [8] in which Ar² represents a 1,4-phenylene group, a 1,3-phenylene group, a 2,6-naphthylene group, or a diphenylether-4,4'-diyl group.

[10] The method for producing a resin composition according to any one of [7] to [9] in which Ar³ represents a 1,4-phenylene group or a 4,4'-biphenylylene group.

[11] The method for producing a resin composition according to any one of [6] to [10] in which the content of the repeating unit (1) is 30 mol % or greater relative to the total amount of the repeating units constituting the liquid crystal polyester.

[12] The method for producing a resin composition according to [11] in which the content of the repeating unit (2) is 35 mol % or less relative to the total amount of the repeating units constituting the liquid crystal polyester.

[13] The method for producing a resin composition according to [12] in which the content of the repeating unit (3) is 35 mol % or less relative to the total amount of the repeating units constituting the liquid crystal polyester.

[14] The method for producing a resin composition according to any one of [7] to [13] in which the proportion of the content of the repeating unit (2) to the content of the repeating unit (3) [the content of the repeating unit (2)/the content of the repeating unit (3)] (mol/mol) is 0.9/1 to 1/0.9.

[15] The method for producing a resin composition according to any one of [4] to [14] in which the flow starting temperature of the liquid crystal polyester is 270° C. or higher.

[16] The method for producing a resin composition according to any one of [1] to [15], in which the fibrous filler (B) is one or more fillers selected from the group consisting of glass fiber, basalt fiber, alumina fiber, silica alumina fiber, potassium titanate whisker, barium titanate whisker, and wollastonite whisker.

[17] The method for producing a resin composition according to [16] in which the fibrous filler (B) is the glass fiber.

[18] The method for producing a resin composition according to any one of [1] to [17] in which the weight average fiber length of the fibrous filler (B) to be fed to the extruder is 1 mm or greater.

[19] The method for producing a resin composition according to any one of [1] to [18] in which the average fiber diameter of the fibrous filler (B) in the resin composition is 3 μm to 15μm.

[20] The method for producing a resin composition according to any one of [1] to [19] in which the particulate filler (C) is one or more fillers selected from the group consisting of titanium oxide, zirconium oxide, alumina, zirconium carbide, silicon carbide, and boron carbide.

[21] The method for producing a resin composition according to any one of [1] to [20] in which the proportion of the resin (A) relative to the total supplied amount of the resin (A) and the fibrous filler (B) is 50% by mass to 80% by mass.

[22] The method for producing a resin composition according to any one of [1] to [21] in which the supplied amount of the particulate filler (C) is 0.1 parts by mass to 3 parts by mass relative to 100 parts by mass of the total supplied amount of the resin (A) and the fibrous filler (B). [23] The method for producing a resin composition according to any one of [1] to [22] in which the resin composition forms a pellet.

Effects of Invention

According to the present invention, an efficient and highly versatile method is provided for producing a resin composition which contains a fibrous filler being 140 μm or less in weight average fiber length.

BRIEF DESCRIPTION OF DRAWING

FIG. 1 is a schematic cross-sectional view illustrating an extruder to be used in the method for producing a resin composition according to the present invention.

DESCRIPTION OF EMBODIMENTS

The method for producing a resin composition according to the present invention is a method for producing a resin composition including feeding a resin (A), a fibrous filler (B), and a particulate filler (C) which is harder than the fibrous filler (B) to an extruder, and melt-kneading to extrude a kneaded material, in which method the resin composition contains a fibrous filler (B) which is 140 μm or less in weight average fiber length.

According to the present invention, a resin composition containing the fibrous filler (B) having the weight average fiber length of 140 μm or less is obtained by a single melt-kneading using a usual extruder, and a resin composition for obtaining a molded article having excellent dust resistance can efficiently be obtained with highly versatility.

Examples of the resin (A) to be used in the method of manufacturing a resin composition according to the present invention include liquid crystalline polyesters, polyphenylene sulfides, polyethersulfones, polyamides and polyimides.

For the resin (A), a single resin may be used alone, or a combination of two or more resins may be used.

The resin (A) is preferably a liquid crystalline polyester. In other words, the resin composition is preferably a liquid crystalline polyester composition.

The liquid crystalline polyester is a polyester that exhibits liquid crystallinity in a melted state, and is preferably a liquid crystalline polyester which melts at a temperature of not more than 450° C. The liquid crystalline polyester may also be a liquid crystalline polyesteramide, a liquid crystalline polyester ether, a liquid crystalline polyester carbonate, or a liquid crystalline polyesterimide. The liquid crystalline polyester is preferably a totally aromatic liquid crystalline polyester prepared using only aromatic compounds as the raw material monomers.

Typical examples of the liquid crystalline polyester include:0

(I) liquid crystalline polyesters produced by polymerizing (polycondensing) at least one compound selected from the group consisting of aromatic diols, aromatic hydroxyamines and aromatic diamines, an aromatic hydroxycarboxylic acid, and an aromatic dicarboxylic acid;

(II) liquid crystalline polyesters produced by polymerizing a plurality of aromatic hydroxycarboxylic acids;

(III) liquid crystalline polyesters produced by polymerizing at least one compound selected from the group consisting of aromatic diols, aromatic hydroxyamines and aromatic diamines, and an aromatic dicarboxylic acid; and (IV) liquid crystalline polyesters produced by polymerizing a polyester such as a polyethylene terephthalate, and an aromatic hydroxycarboxylic acid.

Here, each of the aromatic hydroxycarboxylic acid, the aromatic dicarboxylic acid, the aromatic diol, the aromatic hydroxyamine and the aromatic diamine may independently be partially or completely replaced with a polymerizable derivative thereof.

An aromatic hydroxycarboxylic acid is a compound in which two of the hydrogen atoms bonded to an aromatic ring of an aromatic compound are substituted with a hydroxyl group and a carboxyl group respectively.

An aromatic dicarboxylic acid is a compound in which two of the hydrogen atoms bonded to an aromatic ring of an aromatic compound are each substituted with a carboxyl group.

An aromatic diol is a compound in which two of the hydrogen atoms bonded to an aromatic ring of an aromatic compound are each substituted with a hydroxyl group.

An aromatic hydroxyamine is a compound in which two of the hydrogen atoms bonded to an aromatic ring of an aromatic compound are substituted with a hydroxyl group and an amino group respectively.

An aromatic diamine is a compound in which two of the hydrogen atoms bonded to an aromatic ring of an aromatic compound are each substituted with an amino group.

Examples of the aromatic compound include benzene, naphthalene and biphenyl.

Here, instead of a part or all of each of aromatic hydroxycarboxylic acid, aromatic dicarboxylic acid, aromatic diol, aromatic hydroxyamine, and aromatic diamine, the polymerizable derivatives thereof may be used.

Examples of polymerizable derivatives of a compound having a carboxyl group, such as an aromatic hydroxycarboxylic acid or an aromatic dicarboxylic acid, include esters in which the carboxyl group is substituted with an alkoxycarbonyl group or an aryloxycarbonyl group, acid halides in which the carboxyl group is substituted with a haloformyl group, and acid anhydrides in which the carboxyl group is substituted with an acyloxycarbonyl group.

Examples of polymerizable derivatives of a compound having a hydroxyl group, such as an aromatic hydroxycarboxylic acid, an aromatic diol or an aromatic hydroxyamine, include acyloxylated compounds in which the hydroxyl group is acylated and substituted with an acyloxyl group.

Examples of polymerizable derivatives of a compound having an amino group, such as an aromatic hydroxyamine or an aromatic diamine, include acylaminated compounds in which the amino group is acylated and substituted with an acylamino group.

The liquid crystalline polyester, preferably has a repeating unit represented by the following formulas (1) to (3) (hereinafter, also referred to as "repeating unit (1)", "repeating unit (2)", and "repeating unit (3)", respectively) alone, or may independently have two or more thereof. Among these, the liquid crystal polyester preferably has the repeating unit (1), and more preferably has the repeating units (1) to (3).

[Chem. 5]

$$—O—Ar^1—CO— \quad (1)$$

[Chem. 6]

$$—CO—Ar^2—CO— \quad (2)$$

[Chem. 7]

$$—X—Ar^3—Y— \quad (3)$$

In the formulas, $Ar^1$ represents a phenylene group, naphthylene group or biphenylylene group; each of $Ar^2$ and $Ar^3$ independently represents a phenylene group, naphthylene group, biphenylylene group or a group represented by general formula (4) shown below; each of X and Y independently represents an oxygen atom or an imino group; and one or more hydrogen atoms in $Ar^1$, $Ar^2$ and $Ar^3$ may each be independently substituted with a halogen atom, an alkyl group or an aryl group.

[Chem. 8]

$$—Ar^4—Z—Ar^5— \quad (4)$$

In the formula, each of $Ar^4$ and $Ar^5$ independently represents a phenylene group or a naphthylene group; and Z represents an oxygen atom, sulfur atom, carbonyl group, sulfonyl group or alkylidene group.

Examples of the halogen atoms which may substitute a hydrogen atom in $Ar^1$, $Ar^2$ or $Ar^3$ include a fluorine atom, chlorine atom, bromine atom and iodine atom.

The alkyl group which may substitute a hydrogen atom in $Ar^1$, $Ar^2$ or $Ar^3$ preferably has a carbon number of 1 to 10, and examples include a methyl group, ethyl group, n-propyl group, isopropyl group, n-butyl group, isobutyl group, sec-butyl group, tert-butyl group, n-pentyl group, n-hexyl group, n-heptyl group, 2-ethylhexyl group, n-octyl group, n-nonyl group and n-decyl group. The aryl group which may substitute a hydrogen atom in $Ar^1$, $Ar^2$ or $Ar^3$ preferably has a carbon number of 6 to 20, and examples include a phenyl group, o-tolyl group, m-tolyl group, p-tolyl group, 1-naphthyl group and 2-naphthyl group.

When hydrogen atoms are substituted with one of these groups, the number of hydrogen atoms substituted, for each group represented by $Ar^1$, $Ar^2$ or $Ar^3$, is preferably not more than 2 in each case.

The alkylidene group for Z preferably has a carbon number of 1 to 10, and examples include a methylene group, ethylidene group, isopropylidene group, n-butylidene group and 2-ethylhexylidene group.

The repeating unit (1) is a repeating unit derived from a specific aromatic hydroxycarboxylic acid. The repeating unit (1) is preferably a repeating unit in which $Ar^1$ represents a 1,4-phenylene group (a repeating unit derived from p-hydroxybenzoic acid) or a repeating unit in which $Ar^1$ represents a 2,6-naphthylene group (a repeating unit derived from 6-hydroxy-2-naphthoic acid).

The repeating unit (2) is a repeating unit derived from a specific aromatic dicarboxylic acid. The repeating unit (2) is preferably a repeating unit in which $Ar^2$ represents a 1,4-phenylene group (a repeating unit derived from terephthalic acid), a repeating unit in which $Ar^2$ represents a 1,3-phenylene group (a repeating unit derived from isophthalic acid), a repeating unit in which $Ar^2$ represents a 2,6-naphthylene group (a repeating unit derived from 2,6-naphthalenedicarboxylic acid), or a repeating unit in which $Ar^2$ represents a diphenyl ether-4,4'-diyl group (a repeating unit derived from diphenyl ether-4,4'-di carboxylic acid).

The repeating unit (3) is a repeating unit derived from a specific aromatic diol, aromatic hydroxyamine or aromatic diamine. The repeating unit (3) is preferably a repeating unit in which $Ar^3$ represents a 1,4-phenylene group (a repeating unit derived from hydroquinone, p-aminophenol or p-phenylenediamine) or a repeating unit in which $Ar^3$ represents a 4,4'-biphenylylene group (a repeating unit derived from 4,4'-dihydroxybiphenyl, 4-amino-4'-hydroxybiphenyl or 4,4'-diaminobiphenyl).

The amount of the repeating unit (1) with respect to the total amount of all the repeating units that constitute the resin (A) such as a liquid crystalline polyester (the value obtained by determining the substance-equivalent amount (mol) of each repeating unit by dividing the mass of each repeating unit that constitutes the resin (A) such as a liquid crystalline polyester by the formula weight of the repeating unit, and then totaling these substance-equivalent amounts) is preferably at least 30 mol %, more preferably 30 to 80 mol %, still more preferably 40 to 70 mol %, and particularly preferably 45 to 65 mol %.

The amount of the repeating unit (2) with respect to the total amount of all the repeating units that constitute the resin (A) such as a liquid crystalline polyester is preferably not more than 35 mol %, more preferably 10 to 35 mol %, still more preferably 15 to 30 mol %, and particularly preferably 17.5 to 27.5 mol %.

The amount of the repeating unit (3) with respect to the total amount of all the repeating units that constitute the resin (A) such as a liquid crystalline polyester is preferably not more than 35 mol %, more preferably 10 to 35 mol %, still more preferably 15 to 30 mol %, and particularly preferably 17.5 to 27.5 mol %.

The larger the amount of the repeating unit (1), the more easily the melt fluidity, the heat resistance, and the strength and rigidity of the resin (A) such as a liquid crystalline polyester can be improved, but if the amount of the repeating unit (1) is too large, then the melting temperature and the melt viscosity of the liquid crystalline polyester tend to increase, and the temperature required for molding tends to increase.

The ratio between the amount of the repeating unit (2) and the amount of the repeating unit (3) is represented by [amount of repeating unit (2)]/[amount of repeating unit (3)] (mol/mol), and is preferably from 0.9/1 to 1/0.9, more preferably from 0.95/1 to 1/0.95, and still more preferably from 0.98/1 to 1/0.98.

In addition, the liquid crystalline polyester may have the repeating units (1) to (3) each independently in two or more. Further, a liquid crystalline polyester may also include repeating units other than the repeating units (1) to (3), but the amount of these other repeating units with respect to the total amount of all the repeating units that constitute the liquid crystalline polyester is preferably not more than 10 mol %, and more preferably 5 mol % or less.

The liquid crystalline polyester preferably has, as the repeating unit (3), a repeating unit in which X and Y are both oxygen atoms, namely a repeating unit derived from a specific aromatic diol, and more preferably has only repeating units in which X and Y are both oxygen atoms as the repeating unit (3). This tends to facilitate lowering of the melt viscosity of the liquid crystalline polyester.

The liquid crystalline polyester is preferably manufactured by melt polymerizing the raw material monomers corresponding with the repeating units that constitute the resin, and then subjecting the obtained polymer (prepolymer) to solid phase polymerization. This enables it to manufacture with good operability a high-molecular weight liquid crystalline polyester with high levels of heat resistance, strength and rigidity. The melt polymerization may be performed in the presence of a catalyst, and in such a case, examples of the catalyst include metallic compounds such as magnesium acetate, stannous acetate, tetrabutyl titanate, lead acetate, sodium acetate, potassium acetate and antimony trioxide, and nitrogen-containing heterocyclic compounds such as 4-(dimethylamino)pyridine and 1-methylimidazole. A nitrogen-containing heterocyclic compound is preferably used.

The liquid crystalline polyester supplied to the extruder has a flow starting temperature that is preferably at least 270° C., more preferably 270° C. to 400° C., and still more preferably 280° C. to 380° C. The higher the flow starting temperature, the more easily the heat resistance and the strength and rigidity can be increased, but if the flow starting temperature is too high, it is likely to increase the melting temperature or the melt viscosity, and increase the temperature required for molding.

The "flow starting temperature", also termed the "flow temperature", means such temperature that the viscosity is 4,800 Pa·s (48,000 poise) when the liquid crystalline polyester is melted by heating at a rate of 4° C./minute under a load of 9.8 MPa (100 kg/cm$^2$) using a capillary rheometer, and extruded from a nozzle being 1 mm in its inner diameter and 10 mm in its length, which provides an indication of the molecular weight of the liquid crystalline polyester (see Naoyuki Koide (ed.), "Liquid Crystalline Polymers—Synthesis, Molding, Applications—", CMC Publishing Co., Ltd., Jun. 5, 1987, p. 95).

When a liquid crystalline polyester is used as the resin (A), a resin (A) other than the liquid crystalline polyester may be used in combination with the liquid crystalline polyester, including polyesters other than liquid crystalline polyesters, such as polypropylenes and polyamides; thermoplastic resins other than liquid crystalline polyesters, such as polysulfones, polyphenylene sulfides, polyetherketones, polycarbonates, polyphenylene ethers and polyetherimides; and thermosetting resins such as phenol resins, epoxy resins, polyimide resins, and cyanate resins.

The amount supplied of the resin other than the liquid crystalline polyester is preferably from 0 to 99 parts by mass per 100 parts by mass of the liquid crystalline polyester.

The fibrous filler (B) may be an inorganic filler, or an organic filler.

Examples of the fibrous inorganic filler include ceramic fibers such as glass fiber, basalt fiber, silica fiber, alumina fiber, and silica alumina fiber can be exemplified. In addition, whiskers such as potassium titanate whisker, barium titanate whisker, and wollastonite whisker.

Examples of the fibrous organic filler include polyester fiber and aramid fiber.

The fibrous filler (B) may be used alone or in combination of two or more kinds thereof.

The fibrous filler (B) is preferably a ceramic fiber, more preferably one or more types of fiber selected from the group consisting of glass fiber, basalt fiber, alumina fiber and silica alumina fiber, and in terms of availability and the abrasive load applied to the apparatus during molding processing, is still more preferably a glass fiber.

The fibrous filler (B) may be a fibrous filler which has been subjected to a surface coating treatment with a surface coating agent or a coupling agent such as a titanium coupling agent, or a surface coating treatment with any of various thermosetting resins or thermoplastic resins. By using this type of fibrous filler (B), the amount of gas generated from the molded article described below can be better reduced, the chemical stability of the molded article can be improved, and when an electrical or electronic device or an optical device is assembled, contamination of nearby components due to gas generated from the molded article can be reduced.

Further, among the various possibilities for the fibrous filler (B), the glass fiber may be treated with an epoxy-based, urethane-based or acrylic-based coating agent or sizing agent.

The weight average fiber length of the fibrous filler (B) is 1 mm or more, preferably 1 to 10 mm, and more preferably 1 to 6 mm.

The fibrous filler (B) is preferably composed of uniformly chopped strands in which there is no distribution in the fiber length.

The average fiber diameter of the fibrous filler (B) may be similar to typical manufactured products, and is preferably from 3 to 15 µm. When the average fiber diameter is 3 µm or more, the reinforcing effect on the molded article improves. Further, when the average fiber diameter is not more than 15 µm, the moldability improves, and the external appearance of the surface of the molded article is more favorable.

The particulate filler (C) is harder than the fibrous filler (B), and shortens the fiber length of the fibrous filler (B) during melt-kneading.

The particulate filler (C) may be an inorganic filler, or an organic filler.

Examples of the particulate filler (C) include titanium oxide, zirconium oxide, alumina, zirconium carbide, silicon carbide, and boron carbide.

The particulate filler (C) may be used alone or in combination of two or more kinds thereof.

As the particulate filler (C), the titanium oxide is preferable in consideration of wear load applied to the apparatus during molding processing and availability.

Hardness of the particulate filler (C) may be represented by the Mohs' hardness, for example. Moreover, hardness of the fibrous filler (B) may also be represented by the Mohs' hardness, for example.

The Mohs' hardness is an empirical scale determining hardness of minerals by comparing 10 species of minerals used as the reference. The minerals used as the reference are talc, plaster, calcite, fluorite, apatite, orthoclase, quartz, topaz, corundum, and diamond in an order of soft mineral (Mohs' hardness 1) to hard mineral (Mohs' hardness 10), and the hardness is measured by confirming the presence or absence of scratches after rubbing the reference mineral with a sample material of which the hardness is measured. For example, in a case where scratches do not occur in the fluorite and scratches occur in apatite, Mohs' hardness of the sample material is 4.5 (between 4 and 5).

In the present invention, in addition to the resin (A), the fibrous filler (B), and the particulate filler (C), a resin composition may be produced by feeding components of fillers other than these fillers, additives, and the like to an extruder.

The other components may be used singly or in combination of two or more kinds thereof.

The supplied amount of the other fillers is preferably 0 parts by mass to 100 parts by mass relative to 100 parts by mass of the resin (A) such as the liquid crystal polyester.

Examples of the additives include an antioxidant, a thermal stabilizer, an ultraviolet absorbent, an antistatic agent, a surfactant, a flame retardant, and a colorant.

The supplied amount of the additives is preferably 0 parts by mass to 5 parts by mass relative to 100 parts by mass of the resin (A) such as the liquid crystal polyester.

The resin composition is produced by feeding, to the extruder, the resin (A), the fibrous filler (B), the particulate filler (C), and other components used if necessary, and melt-kneading to extrude a kneaded material. After extruding the kneaded material, the resin composition is preferably made in the form of a pellet.

In the method of manufacturing a resin composition of the present invention, the extruder has a cylinder and one or more screws disposed inside the cylinder, which extruder is preferably provided with feed (supply) ports in two or more locations in the cylinder, and more preferably further provided with vents in one or more locations in the cylinder. The cylinder is preferably provided with a main feed port and a side feed port which is disposed downstream in the extrusion direction from the main feed port.

The amount of the resin (A), based on the total supplied amount of the resin (A) and the fibrous filler (B), is preferably from 50 to 80% by mass, and more preferably from 60 to 70% by mass. By setting it to the lower limit or more, the fluidity of the resin composition improves, and molding can be performed more easily. Further, by setting it to the upper limit or less, the reinforcing effect due to the fibrous filler (B) improves, and the rigidity of the molded article improves.

The supplied amount of the particulate filler (C) relative to 100 parts by mass of the total supplied amount of the resin (A) and the fibrous filler (B) is preferably 0.1 parts by mass to 3 parts by mass, and more preferably 0.5 parts by mass to 2 parts by mass.

When the supplied amount is the lower limit value or greater, the effect of shortening the fiber length of the fibrous filler (B) in the resin composition by the particulate filler (C) is further improved. In addition, when the supplied amount is the upper limit value or less, the fluidity of the resin composition is improved, and molding becomes easier.

FIG. 1 is a schematic cross-sectional view illustrating an extruder to be used in the method of manufacturing a resin composition according to an embodiment of the present invention.

The extruder 10 shown in FIG. 1 is provided with a motor 1 housed in a motor box 1a, a cylinder 2 provided adjacent to the motor box 1a, and a screw 3 which is inserted inside the cylinder 2 and connected to the motor 1. The extruder 10 is a twin screw extruder in which two screws 3 are disposed inside the cylinder 2.

The cylinder 2 is provided with a main feed port 5 for supplying components such as the resin (A) (hereinafter, the components are sometimes referred to collectively as "raw material components") into the cylinder 2, a side feed port 7 for supplying a portion of the raw material components into the cylinder 2 as required, from a position downstream (afterward) in the extrusion direction from the main feed port 5, a first vent 4 and a second vent 6 for discharging volatile components (gas) generated inside the cylinder 2, and a discharge die 9 which molds the kneaded material obtained by melt-kneading.

In the cylinder 2, the main feed port 5 is provided in the most upstream position in the extrusion direction (the position closest to the motor box 1); the side feed port 7, the first vent 4 and the second vent 6 are provided in sequence downstream from the main feed port 5 in the extrusion direction (namely, in the direction of the extrusion, toward the discharge die 9); and the discharge die 9 which has a nozzle hole 9a that is interconnected with the cylinder 2 is provided at the downstream end of the cylinder 2 in the extrusion direction.

The main feed port 5 and the side feed port 7 are each provided with a hopper that is connected to the interior of the cylinder 2, and a supply device which supplies a fixed mass or a fixed volume of a raw material component. Examples of the supply system of the supply devices include a belt system, screw system, oscillating system and table system.

The first vent 4 and the second vent 6 may be open vent systems that are open to the atmosphere, or vacuum vent systems which are connected to a water seal pump, rotary pump, oil diffusion pump or turbo pump, and are held under vacuum.

A transport section 8 for transporting the raw material components or the kneaded material is provided on the screw 3. Further, a first kneading section 11 for performing plasticization and kneading of the raw material components or the kneaded material is provided on the screw 3 between the main feed port 5 and the side feed port 7; a second kneading section 12 for performing plasticization and kneading of the raw material components or the kneaded material is provided on the screw 3 between the side feed port 7 and the first vent 4; and in addition to the first vent 4 and the second vent 6, a fourth kneading section and a fifth kneading section (not shown in the figure), different from a third kneading section 13 described below, may be provided. In this case, the temperature of the cylinder is preferably carefully controlled in order to suppress shear heating.

This type of screw 3 is constructed by assembling screw elements. The transport section 8 is a forward flight (full flight) screw element; and the first kneading section 11, the second kneading section 12 and the third kneading section 13 are generally composed of a combination of screw elements such as a full flight, reverse flight, seal ring, forward kneading disc, neutral kneading disc, and reverse kneading disc.

The first kneading section 11, the second kneading section 12 and the third kneading section 13 preferably each use an element having a configuration in which kneading discs are superposed while being staggered at a phase angle exceeding 0 degrees but less than 90 degrees, and a neutral kneading element (a configuration in which kneading discs are superposed while being staggered at a phase angle of 90 degrees).

When an additional kneading section is provided downstream in the extrusion direction from the third kneading section 13 of the screw 3, it is preferable that a neutral kneading element is used for the kneading section located at the most downstream position, and that an element having a configuration in which kneading discs are superposed while being staggered at a phase angle exceeding 0 degrees but less than 90 degrees, and a neutral kneading element are used for the kneading sections other than the most downstream kneading section. For example, when a fourth kneading section and a fifth kneading section are also provided at the first vent 4 and the second vent 6, it is preferable that an element having a configuration in which kneading discs are superposed while being staggered at a phase angle exceeding 0 degrees but less than 90 degrees, and a neutral kneading element are used as the elements for the first to fourth kneading sections, and that a neutral kneading element is used as the element for the fifth kneading section.

Any screw elements may be used as the other elements that constitute the screw 3, provided they do not impair the overall capability of the screw to transport the melted kneaded material.

The extruder used in the present invention is not limited to the twin screw extruder illustrated in FIG. 1, and a short screw extruder may also be used.

Examples of the twin screw extruder include co-rotating single-thread to triple-thread twin screw extruders, and counter-rotating parallel axis type, inclined axis type or incomplete engagement type twin screw extruders, and a co-rotating twin screw extruder is preferred.

Extruders described above are not the only type that can be used in the present invention, and in the present invention, the extruder is not limited thereto, and various known extruders can be used.

In the present invention, in a case where a plurality of feeding ports (main feeding port and side feeding port) are provided to the extruder to be used, each of raw material components of the resin (A) and the like can be fed to the extruder from any one of the main feeding port and the side feeding port, and at least a part is preferably fed from the main feeding port. At this time, each of the raw material components may be entirely fed to the extruder from the main feeding port, a part may be fed to the extruder from the main feeding port and the remainder (the amount obtained by subtracting the supplied amount from the main feeding port from the total supplied amount) may be fed to the extruder from the side feeding part.

In the present invention, after two or more components selected from the group consisting of the resin (A), the fibrous filler (B), the particulate filler (C), and other components used if necessary are mixed in advance, the mixture may be fed to the extruder (at this time, there may be components supplied without mixing), and the entire components are separately fed to the extruder. Here, from the viewpoint of further improving the effect of shortening the fiber length of the fibrous filler (B) in the resin composition to be obtained, the fibrous filler (B) and the particulate filler (C) are preferably separately fed to the extruder.

The weight average fiber length of the fibrous filler (B) in the resin composition obtained by extruding the kneaded material is 140 μm or less, preferably 80 μm to 140 μm, and more preferably 80 μm to 120 μm. In addition, the number average fiber length is preferably 80 μm to 120 μm, and more preferably 80 μm to 100 μm. In addition, when the weight average fiber length and the number average fiber length are the upper limit value or less, the fluidity of the resin composition is improved, and molding becomes easier. In addition, the appearance of a molded article surface becomes excellent, and dusting characteristics due to the detachment of the fibrous filler (B) or generation of resin dust derived therefrom are improved, (dust resistance is improved). In addition, when the weight average fiber length and the number average fiber length are the lower limit value or greater, the reinforcement effect by the fibrous filler (B) is improved, the rigidity of a molded article is further improved, and anisotropy becomes small.

The "weight average fiber length" and the "number average fiber length" of the fibrous filler can be determined, for example, by placing 1.0 g of the resin composition in a crucible, ashing the composition by treatment in an electric furnace at 600° C. for 4 hours, dispersing the residue in methanol, taking a microscope photograph with the dispersion spread on a slide glass, using a magnifier (such as an optical microscope or an electron microscope) to detect the shape of the fibrous filler from the photograph, and then calculating the average value for the fiber length.

The resin composition is suitable for producing various molded bodies.

The molding method of the resin composition is preferably a melt-molding method, and as an example thereof, an injection-molding method; an extrusion-molding method such as a T-die method and an inflation method; a compression-molding method; a blow-molding method; a vacuum-molding method; and a press-molding method can be exemplified, and the injection-molding method is preferable.

Examples of the molded article include electric and electronic parts, and optical parts, and specific examples thereof include semiconductor production process-related parts such as a connector, a socket, relay parts, a coil bobbin, an optical pickup, an oscillator, a printed wiring board, a circuit board, a semiconductor package, a computer-related parts, a camera barrel, an optical sensor housing, a compact camera module housing (package, barrel), a projector optical engine constituent member, an IC tray, and a wafer carrier; home electric appliance parts such as a VTR, a TV, an iron, an air conditioner, a stereo record player, a vacuum cleaner, a refrigerator, a rice cooker, and a lighting equipment; lighting equipment parts such as a lamp reflector and a lamp holder; acoustic product parts such as a compact disc, a laser disc (registered trademark), and a speaker; and communication instrument parts such as a ferrule for an optical cable, phone parts, facsimile parts, and a modem.

In addition, examples other than these include copier- or printer-related parts such as a separation claw and a heater holder; machine parts such as an impeller, a fan gear, a gear, a bearing, motor parts, and a case; auto parts such as automotive machinery parts, engine parts, engine room parts, electric parts, and interior parts; cooking appliances such as a microwave cooking pots and heat-resistant tableware; construction materials or civil engineering and construction materials such as insulation or soundproof materials of flooring or wall materials, support materials of a beam or a pillar, and roofing materials; aircraft, spacecraft, and space instrument parts; radiation facility members such as a nuclear reactor; marine facility members; cleaning tools; optical equipment parts; valves; pipes; nozzles; filters; a membrane; medical equipment parts and medical materials; sensor parts; sanitary fixtures; sporting goods; and leisure goods.

When the weight average fiber length of the fibrous filler (B) in the resin composition is 140 µm or less, the molded article obtained by using the resin composition has excellent moldability, excellent appearance of the surface, and excellent dust resistance.

EXAMPLES

The present invention is described below in further detail using a series of examples. However, the present invention is in no way limited by the examples presented below. The flow starting temperature of the liquid crystalline polyesters, and the weight average fiber length and number average fiber length of fibrous fillers in the liquid crystalline polyester compositions were measured using the following methods.

(Measurement of Flow Starting Temperature of Liquid Crystalline Polyester Supplied to Extruder)

Using a flow tester (CFT-500 model, manufactured by Shimadzu Corporation), approximately 2 g of the liquid crystalline polyester was packed in a cylinder fitted with a die having a nozzle with its inner diameter of 1 mm and its length of 10 mm, the liquid crystalline polyester was melted by heating at a rate of 4° C./minute under the load of 9.8 MPa (100 kg/cm$^2$), and was then extruded from the nozzle, and the temperature at which the viscosity was 4,800 Pa·s (48,000 poise) was measured.

(Measurement of Weight Average Fiber Length and Number Average Fiber Length of Fibrous Filler in Liquid Crystalline Polyester Composition)

1.0 g of the liquid crystalline polyester composition was placed in a crucible, the composition was ashed by treatment in an electric furnace at 600° C. for 4 hours, the residue was dispersed in methanol, a microscope photograph was taken with the dispersion spread on a slide glass, the shape of the fibrous filler (glass fiber) was read directly from the photograph, and the average value of the fiber length was calculated. When calculating the average value, a sample size of 400 or more was used. For each weight, the weight for each fiber length was calculated using the specific gravity of the fibrous filler, and the total weight of the sample used was used in calculating the average value.

<Manufacture of Liquid Crystalline Polyester>

Production Example 1

A reactor fitted with a stirrer, a torque meter, a nitrogen gas inlet, a thermometer and a reflex condenser was charged with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid, 1347.6 g (13.2 mol) of acetic anhydride, and 0.194 g of 1-methylimidazole. Then, after replacing by nitrogen gas within the inside of the reactor, the temperature inside the reactor was raised from room temperature to 145° C. over 15 minutes, under stirring and under a nitrogen gas flow, and refluxing was then performed for one hour at this temperature (145° C.). Subsequently, 0.194 g of 1-methylimidazole was added thereto, the temperature was then raised from 145° C. to 320° C. over 3 hours while by-product acetic acid and unreacted acetic anhydride were removed by distillation, and the temperature of 320° C. was then maintained for 2 hours. The contents were then removed from the reactor and cooled to room temperature, and the resulting solid was crushed with a crusher, yielding a powdered prepolymer. The flow starting temperature of this prepolymer was 261° C.

Subsequently, this prepolymer was heated from room temperature to 250° C. over one hour under a nitrogen gas atmosphere, and the temperature was then raised from 250° C. to 285° C. over 5 hours and held at 285° C. for 3 hours to effect a solid phase polymerization. The reaction mixture was then cooled, yielding a powdered liquid crystalline polyester. The flow starting temperature of this liquid crystalline polyester was 327° C. The liquid crystalline polyester obtained in this manner was termed LCP1.

<Production of Liquid Crystal Polyester Composition>

Example 1 and Comparative Examples 1 to 2

Each of LCP1 obtained in Production Example 1, glass fiber ("CS-3J-260S" manufactured by Nitto Boseki Co., Ltd., weight average fiber length of 3 mm), titanium oxide ("CR-60" manufactured by Ishihara Sangyo Kaisha, Ltd.), or glass beads ("EGB731" Manufactured by Potters-Ballotini Co., Ltd.) was separately fed in whole into a twin screw extruder ("TEM-41SS" manufactured by Toshiba Machine Co., Ltd.) from a main feeding port according to the supplied amount (parts by mass) shown in Table 1, melt-kneading was performed at a cylinder temperature of 340° C., and the kneaded material was extruded, whereby pellets of the liquid crystal polyester composition were obtained. The twin screw extruder used has a constitution shown in FIG. 1. Then, the weight average fiber length and the number average fiber length of glass fiber in the obtained pellets were calculated. The results are shown in Table 2. Moreover, titanium oxide is a material (Mohs' hardness 7) harder than glass fiber (Mohs' hardness 6.5), and glass beads are materials having hardness equivalent to that of the glass fiber or a material less hard than the glass fiber.

TABLE 1

| | Feeding component (parts by mass) | | | |
|---|---|---|---|---|
| | LCP 1 | Glass fiber | Titanium oxide | Glass beads |
| Example 1 | 60 | 40 | 1 | 0 |
| Comparative Example 1 | 60 | 40 | 0 | 1 |
| Comparative Example 2 | 60 | 40 | 0 | 0 |

TABLE 2

| | Weight average fiber length (μm) | Number average fiber length (μm) |
|---|---|---|
| Example 1 | 99 | 85 |
| Comparative Example 1 | 155 | 112 |
| Comparative Example 2 | 150 | 110 |

As apparent from the results described above, in Example 1, the liquid crystal polyester composition which contained the glass fiber being 140 μm or less in weight average fiber length was obtained by a single melt-kneading.

In contrast, in Comparative Examples 1 and 2, the liquid crystal polyester composition in which the weight average fiber length of the glass fiber was reduced to 140 μm or less was not obtained by a single melt-kneading.

INDUSTRIAL APPLICABILITY

The present invention can be used in production of various molded bodies which require dust resistance including electric and electronic parts, and optical parts.

DESCRIPTION OF REFERENCE SIGNS

1 . . . Motor,
1a . . . Motor box,
2 . . . Cylinder,
3 . . . Screw,
4 . . . First vent portion,
5 . . . Main feeding port,
6 . . . Second vent portion,
7 . . . Side feeding port,
8 . . . Transporting portion,
9 . . . Ejection die,
9a . . . Nozzle hole,
10 . . . Extruder,
11 . . . First kneading portion,
12 . . . Second kneading portion,
13 . . . Third kneading portion

The invention claimed is:

1. A method for producing a resin composition, comprising:
feeding a resin (A), a fibrous filler (B), and a particulate filler (C) which is harder than the fibrous filler (B) to an extruder; and
melt-kneading to extrude a kneaded material,
wherein the fibrous filler (B) in the resin composition has a weight average fiber length of 140 μm or less,
wherein the weight average fiber length of the fibrous filler (B) which is fed to the extruder is more than 1 mm, and the supplied amount of the particulate filler (C) relative to 100 parts by mass of the total supplied amount of the resin (A) and the fibrous filler (B) is 0.1 parts by mass to 3 parts by mass, and wherein the fibrous filler (B) and the particulate filler (C) are fed to the extruder separately.

2. The method for producing the resin composition according to claim 1,
wherein the proportion of the resin (A) relative to the total supplied amount of the resin (A) and the fibrous filler (B) is 50% by mass to 80% by mass.

3. The method for producing the resin composition according to claim 2, wherein the resin (A) is liquid crystal polyester.

4. The method for producing the resin composition according to claim 2, wherein the fibrous filler (B) is one or more selected from the group consisting of glass fiber, basalt fiber, alumina fiber, and silica alumina fiber.

5. The method for producing the resin composition according to claim 1, wherein the resin (A) is liquid crystal polyester.

6. The method for producing the resin composition according to claim 5, wherein the fibrous filler (B) is one or more selected from the group consisting of glass fiber, basalt fiber, alumina fiber, and silica alumina fiber.

7. The method for producing the resin composition according to claim 1, wherein the fibrous filler (B) is one or more selected from the group consisting of glass fiber, basalt fiber, alumina fiber, and silica alumina fiber.

* * * * *